(12) United States Patent
Jeon

(10) Patent No.: US 11,086,071 B2
(45) Date of Patent: Aug. 10, 2021

(54) DISPLAY DEVICE

(71) Applicant: LG Display Co., Ltd., Seoul (KR)

(72) Inventor: Se-Hwan Jeon, Busan (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/537,263

(22) Filed: Aug. 9, 2019

(65) Prior Publication Data

US 2020/0064541 A1 Feb. 27, 2020

(30) Foreign Application Priority Data

Aug. 27, 2018 (KR) .......................... 10-2018-0100133

(51) Int. Cl.
*G02B 6/00* (2006.01)
*F21V 8/00* (2006.01)

(52) U.S. Cl.
CPC ......... *G02B 6/0088* (2013.01); *G02B 6/0053* (2013.01); *G02B 6/0055* (2013.01)

(58) Field of Classification Search
CPC .. G02B 6/0055; G02B 6/0058; G02B 6/0088; G02B 6/0053
See application file for complete search history.

(56) References Cited

U.S. PATENT DOCUMENTS

2019/0302342 A1* 10/2019 Kohsaka .............. G02B 6/0045

* cited by examiner

*Primary Examiner* — Anne M Hines
(74) *Attorney, Agent, or Firm* — Fenwick & West LLP

(57) ABSTRACT

A display device is disclosed. The display device includes a light guide plate having a through hole, an optical module disposed in the through hole, a liquid crystal panel disposed on the light guide plate, a guide panel disposed adjacent to the light guide plate, the guide panel supporting the liquid crystal panel, and a reflection enhancement structure provided on at least a surface of the light guide plate or a surface of the guide panel that faces the surface of the light guide plate, wherein reflection enhancement structure may include a plurality of reflective prisms disposed adjacent to a peripheral portion of the through hole of the light guide plate.

17 Claims, 11 Drawing Sheets

FIG. 1A
FIG. 1B
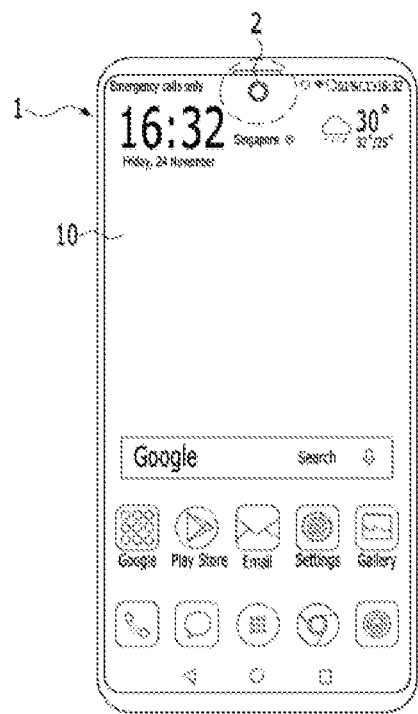
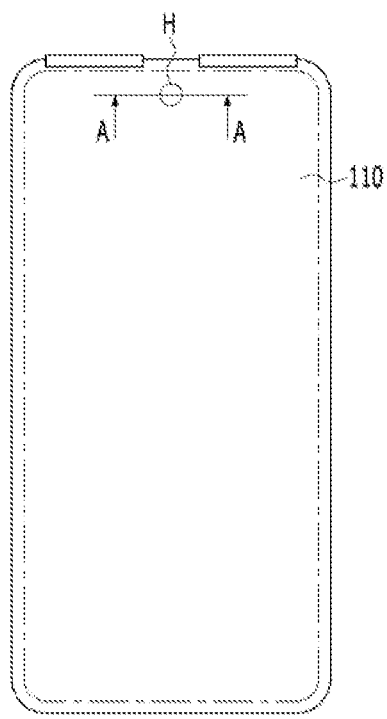

DISPLAY DEVICE

CROSS-REFERENCE TO RELATED APPLICATIONS

This application claims the benefit of the Republic of Korea Patent Application No. 10-2018-0100133, filed on Aug. 27, 2018, which is hereby incorporated by reference in its entirety.

BACKGROUND

Field of Technology

The present disclosure relates to a display device, and more particularly, to a display device equipped with a camera.

Discussion of the Related Art

In the recent information society, a display device, which is a medium for conveying visual information, is receiving a lot of attention. In order to hold a prominent position in the future, such a display device has to satisfy requirements such as low power consumption, reduction of weight and improvement of image quality.

Displays may be classified into self-luminescent display devices, which emit light by themselves, such as a cathode ray tube (CRT), an electroluminescence element (EL), a light-emitting diode (LED), a vacuum fluorescent display (VFD), a field emission display (FED) and a plasma display panel (PDP), and non-luminescent display devices, which cannot emit light by themselves, such as a liquid crystal display (LCD).

Among these various displays, the liquid crystal display device is intended to display an image using the optical anisotropy of the liquid crystal. Since the liquid crystal display device provides more better visibility than a conventional cathode ray tube and reduces both average power consumption and heat discharge compared to a cathode ray tube having the same screen size, it is attracting a lot of attention as a display.

The liquid crystal display device is constructed so as to realize an image in such a way as to control the transmissivity of light emitted from a light source disposed below the liquid crystal by applying an electric field to the liquid crystal and thus controlling the alignment of the liquid crystal. The liquid crystal device is applied to various electronic devices such as smart phones and tablet PCs. In particular, the liquid crystal device includes a cover glass, a liquid crystal panel disposed below the cover glass, a backlight unit disposed below the liquid crystal panel and a cover bottom for accommodating or supporting the liquid crystal panel or the backlight unit.

Since the recent display device is intended to have a slim bezel having a small thickness and to have an ultrathin display panel, demand for a slim and light display device is increasing.

In the recent mobile devices, a display device has come to require a narrow bezel, in which the width of a bezel is minimized so as to maximally expand the visible range of a liquid crystal panel, rather than the slim bezel.

To this end, when the liquid crystal panel is expanded to the whole front surface of a display device equipped with a camera so as to realize a narrow bezel, the liquid crystal panel may expand into the region to which the camera is mounted. In this case, the camera hole regions of the liquid crystal panel, the polarization plate and the backlight unit, at which the camera is mounted, have to be provided with punched through holes or have to be transparent.

SUMMARY

Accordingly, the present disclosure is directed to a display device and a method of manufacturing the same that substantially obviate one or more problems due to limitations and disadvantages of the related art.

An object of the present disclosure is to provide a display device capable of preventing creation of a dark region behind a camera hole in a narrow-bezel-type display equipped with a camera.

Additional advantages, objects, and features of the disclosure will be set forth in part in the description which follows and in part will become apparent to those having ordinary skill in the art upon examination of the following or may be learned from practice of embodiments described in the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a display device includes a light guide plate having a through hole, an optical module disposed in the through hole, a liquid crystal panel disposed on the light guide plate, a guide panel disposed adjacent to the light guide plate, the guide panel supporting the liquid crystal panel, and a reflection enhancement structure provided on at least a surface of the light guide plate or a surface of the guide panel that faces the surface of the light guide plate. The reflection enhancement structure may include a plurality of reflective prisms disposed adjacent to a peripheral portion of the through hole of the light guide plate.

The light guide plate may include a first region between the through hole and the guide panel, a second region disposed to a first side of the first region, and a third region disposed to a second side of the first region. The reflection enhancement structure may include a first reflective prism portion including a plurality of first reflective prisms disposed in a first region of the guide panel, the first region of the guide panel adjacent to the second region of the light guide plate, and a second reflective prism portion including a plurality of reflective prisms disposed in a second region of the guide panel, the second region adjacent to the third region of the light guide plate.

The reflection enhancement structure further may include a planar reflective portion between the first reflective prism portion of the guide panel and the second reflective prism portion of the guide panel, the planar reflective portion adjacent to the first region of the light guide plate.

The planar reflective portion may have a width that is equal to or less than the width of the through hole.

The reflection enhancement structure may include a first reflective prism portion including a plurality of first reflective prisms, which are disposed in the lateral surface of the second region of the light guide plate; and a second reflective prism portion including a plurality of second reflective prisms, which are disposed in the lateral surface of the third region of the light guide plate. Each of the first and second reflective prisms may include a first reflective surface and a second reflective surface.

The second reflective surfaces of the first reflective prisms may have an angle of inclination with respect to a vertical axis in a plan view of the display device greater than an angle of inclination of the first reflective surface of the first reflective prisms, and the first reflective surfaces of the second reflective prisms may have an angle of inclination with respect to the vertical axis greater than an angle of inclination of the second reflective surface of the second reflective prism.

The second reflective surfaces of the first reflective prisms and the first reflective surfaces of the second reflective prisms may reflect the light from the light guide plate to the first region of the light guide plate.

The first reflective prism portion may be symmetrical to the second reflective prism portion.

The first reflective prisms and the second reflective prisms may be recessed from a surface of the guide panel.

The planar reflective portion is adjacent to a lateral surface of the first region of the light guide plate; the first reflective prism portion is adjacent to a lateral surface of the second region of the light guide plate; and the second reflective prism portion is adjacent to a lateral surface of the third region of the light guide plate.

The light guide plate may include circular recesses disposed in a lower surface of the light guide plate, and a first region of the light guide plate includes the circular recesses and prism recesses disposed in the lower surface.

The density of the prism recesses may increase with proximity to a straight center line in the first region of the light guide plate, wherein the straight center line extends through a center of the through hole.

To achieve these objects and other advantages and in accordance with the purpose of the disclosure, as embodied and broadly described herein, a display device includes a light guide plate including through holes, optical modules, each of the optical modules disposed in a corresponding one of the plurality of through holes, a liquid crystal panel disposed on the light guide plate; a guide panel disposed adjacent to the light guide plate, the guide panel supporting the liquid crystal panel; and a reflection enhancement structure provided on at least a surface of the light guide plate of a surface of the guide panel that faces the surface of the light guide plate. The reflection enhancement structure may include a plurality of reflective prisms disposed adjacent to a peripheral portion of the through holes of the light guide plate.

The reflection enhancement structure is in a lateral surface of the guide panel, which is adjacent a lateral surface of the light guide plate. The light guide plate may include first regions disposed respectively between the guide panel and the through holes of the light guide plate, a second region disposed to a first side of a first one of the first regions, a third region disposed to a second side of a last one of the first regions, and at least one fourth region between adjacent first regions. The reflection enhancement structure may include a first reflective prism portion including a plurality of first reflective prisms disposed to a first region of the guide panel, the first region of the guide panel adjacent to the second region of the light guide plate, a second reflective prism portion including a plurality of second reflective prisms disposed to a second region of the guide panel, the second region adjacent to the third region of the light guide plate, and at least one third reflective prism portion including a plurality of third reflective prisms disposed to at least one third region of the guide panel, the at least one third region adjacent to the at least one fourth region of the light guide plate.

The reflection enhancement structure further may include planar reflective portions of the guide panel adjacent to the first regions of the light guide plate. Each of the planar reflective portions has a width equal to or less than a width of each of the through holes.

Each of the first reflective prisms, each of the second reflective prisms, and each of the third reflective prisms may include a first reflective surface and a second reflective surface.

The second reflective surfaces of the first reflective prisms may have an angle of inclination with respect to a vertical axis in a plan view of the display device greater than an angle of inclination of the first reflective surface of the first reflective prisms. The first reflective surfaces of the second reflective prisms may have an angle of inclination with respect to the vertical axis greater than an angle of inclination of the second reflective surface of the second reflective prism. The first reflective surface of the third reflective prisms have the same angle of inclination with respect to the vertical axis as an angle of inclination of the second reflective surface of the third reflective prisms.

The second reflective surfaces of the first reflective prisms may reflect the light from the light guide plate to the first one of the first regions of the light guide plate. The first reflective surfaces of the second reflective prisms may reflect the light from the light guide plate to the last one of the first regions of the light guide plate. The first and second reflective surfaces of the third reflective prisms may reflect the light from the light guide plate to the adjacent first regions of the light guide plate.

The first reflective prisms, the second reflective prisms, the third reflective prisms may be recessed from a surface of the guide panel. The first reflective prism portion may be symmetrical to the second reflective prism portion.

The light guide plate may include circular recesses disposed in a lower surface of the light guide plate; and the first regions of the light guide plate includes the circular recesses and prism recesses disposed in the lower surface of the first regions.

The density of the prism recesses may increase with proximity to a straight center line in each of the first regions of the light guide plate.

To achieve these objects and other advantages and in accordance with the purpose of the disclosure, as embodied and broadly described herein, a display device includes a liquid crystal panel, a light guide plate, an electrical module, and a guide panel. The liquid crystal panel comprises an active area that emits light that forms an image. The light guide plate on the liquid crystal panel, the light guide plate having a hole that is overlapped by the active area of the liquid crystal panel. At least one of an edge of the light guide plate or an edge of the guide panel includes one or more indentations that are non-overlapping with the hole.

In some embodiments, the one or more indentations are non-overlapping with a region of the light guide plate that is between the hole and the guide panel from a plan view of the display device.

In some embodiments, a width of the region is less than or equal to a diameter of the hole.

In some embodiments, the one or more indentations include angled surfaces that reflect light to the region.

In some embodiments, a first portion of the one or more indentations are positioned to a first side of the region, and a second portion of the one or more indentations are positioned to a second side of the region.

In some embodiments, the light guide plate has a second hole and the second portion of the one or more indentations includes a first angled surface that reflects light towards the region and a second angled surface that reflects light towards a region of the light guide plate that is between the second hole and the guide panel from the plan view.

In some embodiments, the hole is further disposed through a portion of the liquid crystal panel.

In some embodiments, the light guide plate further comprises a plurality of recesses along a lower surface of the light guide plate.

In some embodiments, the indentations are in the edge of the light guide plate and not in the edge of the guide panel.

In some embodiments, the indentations are in the edge of the guide panel and not in the edge of the light guide plate.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 1A and 1B illustrate a display device equipped with a camera according to an embodiment, in which FIG. 1A is a front view of the display device, and FIG. 1B is a front view of the display device, from which a cover glass and an upper cover are removed;

DETAILED DESCRIPTION

Figure 2:
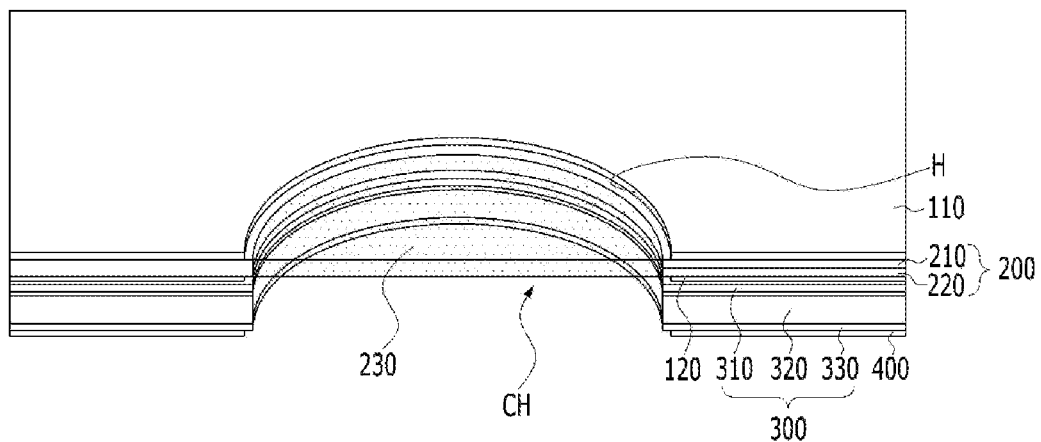
FIG. 2 is a perspective view taken along line A-A in FIG. 1, according to an embodiment.

Hereinafter, embodiments will be clearly revealed via description thereof with reference to the accompanying drawings. In the following description of the embodiments, it will be understood that, when an element such as a layer (film), region, pattern, or structure is referred to as being "on" or "under" another element, it can be "directly" on or under another element or can be "indirectly" formed such that an intervening element may also be present. In addition, it will also be understood that the criteria for "on" or "under" are determined on the basis of the drawings.

In the drawings, the size of each constituent element is exaggerated, omitted, or schematically illustrated for convenience of description and clarity. Also, the size of each constituent element does not entirely reflect the actual size thereof. The same reference numbers will be used throughout the drawings to refer to the same or like parts.

Hereinafter, embodiments of the present disclosure will be described with reference to the accompanying drawings.

FIG. 1A illustrates a front view of a display device equipped with a camera according to an embodiment, and FIG. 1B is a front view of the display device from which a cover glass and an upper cover are removed. FIG. 2 is a perspective view taken along line A-A in FIG. 1B.

Referring to FIGS. 1A and 1B, the display device 1 according to the embodiment includes the camera 2 provided on the front surface thereof, and is constructed so as to realize a narrow bezel, the bezel having as small a width as possible so as to expand the visible range of a liquid crystal panel 200, covered by a cover glass 10, as wide as possible.

The cover glass 10 may include a protective film (not shown) provided on the upper surface thereof. Furthermore, the cover glass 100 may include a touch panel (not shown). The touch panel may be classified into a pressure-sensitive type, in which sensor lines, which are adapted to respond to pressure applied to the surface thereof, are densely arranged so as to recognize the coordinates of a location to which pressure is applied, and an electrostatic type, in which an electric charge is applied to the surface of the cover glass 10 and sensors are provided therearound so as to recognize a contact location on the surface by detecting the extent to which the charge is lost in the event of contact.

As illustrated in FIG. 1B, an upper polarization plate 110 is disposed beneath the cover glass 10, and a through hole H is formed in the upper polarization plate 110 through punching so as to allow operation of the camera 2.

As illustrated in FIG. 2, the through hole H, which is formed in the upper polarization plate 110, may have a location and size corresponding to those of a camera hole CH in which the camera (not shown in FIG. 2) is mounted.

The liquid crystal panel 200 may be disposed between the through hole H and the camera hole CH, and may have a transparent portion 230, which is disposed between the through hole H and the camera hole CH. The liquid crystal panel 200 may have an active area and a non-display area. The liquid crystal panel 200 can emit light that forms an image from the active area.

In some embodiments, the liquid crystal panel 200 includes a color filter substrate 210, in which pixels are arranged in a matrix pattern so as to output an image, an array substrate 220 combined with the color filter substrate 210 so as to define a cell gap therebetween, and a liquid crystal layer (not shown) formed in the cell gap defined between the color filter substrate 210 and the array substrate 220.

The color filter substrate 210 may be composed of a color filter, which is constituted by a plurality of sub color filters for realizing red, green and blue (RGB) colors, a black matrix for isolating the sub color filters from each other and blocking the light transmitted through the liquid crystal layer, and an overcoat layer formed on the color filter and the black matrix.

The array substrate 220 is provided with gate lines and data lines, which are arranged in horizontal and vertical directions so as to define pixel regions (according to some embodiments), and thin film transistors (TFT), which are switching elements, are formed on the cross regions between the gate lines and the data lines. Each of the thin film transistors is composed of a gate electrode connected to the gate line, a source electrode connected to the data line, and a drain electrode connected to a pixel electrode. Any one of the array substrate 220 and the color filter substrate 210 includes a common electrode.

The liquid crystal panel 200, in which the color filter substrate 210 and the array substrate 220 are combined with each other, is provided with the common electrode and the pixel electrode so as to apply an electric field to the liquid crystal layer and to control the voltage of a data signal applied to the pixel electrode in the state in which voltage is applied to the common electrode. Therefore, the liquid crystal in the liquid crystal layer is rotated due to the dielectric anisotropy according to an electric field between the common electrode and the pixel electrode so as to allow or block the transmission of light from the pixels, thereby displaying a character or an image. Here, in order to independently control the voltage of a data signal applied to the pixel electrodes, the switching elements, such as the thin film transistors, are respectively provided at the pixels.

The transparent portion 230 of the liquid crystal panel 200 may be configured to have a shape and size corresponding to those of the camera hole CH and the through hole H, and may be maintained in the transparent state so as to allow image capture by the camera 2. For example, the transparent portion 230 may perform control so as to make a partial region of the liquid crystal panel 200 transparent in a manner of controlling or removing the sub filters in the color filter substrate 210.

The polarization plates 110 and 120 may be respectively attached to the upper surface of the color filter substrate 210 and the lower surface of the array substrate 220. Here, the lower polarization plate 120 functions to polarize light that has passed through a backlight unit 300 toward the array substrate 220, and the upper polarization plate 110 functions to polarize light that has passed through the liquid crystal panel 200.

The backlight unit 300 may include a light guide plate 320 disposed below the liquid crystal panel 200, a plurality of optical sheets 310 for radiating light exiting the light guide plate 320 to the liquid crystal panel 200 with improved efficiency, and a reflective plate 330.

The light guide plate 320 receives light from a light source (not shown) and guides the light toward the liquid crystal panel 200. The light guide plate 320 may be made of a plastic material of polymethylmethacrylate (PMMA) or polycarbonate (PC).

The optical sheet 310 may include a diffusion sheet and a prism sheet, and may further include a brightness enhancement film and a protective sheet, such as dual brightness enhancement film (DBEF). The optical sheet 310 may be disposed between the upper surface of the light guide plate 320 and the rear surface of the liquid crystal panel 200.

The reflective plate 330 is disposed between a cover bottom 400 and the rear surface of the light guide plate 320. The reflective plate 330 reflects both light emitted from the light source and light reflected by the light guide plate 320 toward the liquid crystal panel 200. The light emitted from the enters the lateral surface of the light guide plate 320, which is made of a transparent material, and the reflective plate 330, which is disposed on the rear surface of the light guide plate 320, reflects the light that exits the rear surface of the light guide plate 320 toward the optical sheet 310 on the light guide plate 320, thereby realizing reduction of light loss and improvement in uniformity of luminance.

The backlight unit 300, which includes the above-mentioned components, is received in the cover bottom 400. The backlight unit 300 is not limited to the above-described structure, and any of backlight units 300 having other structures may be applied to the display device 1 according to the present disclosure.

The cover bottom 400 may receive therein the backlight unit 300 and a guide panel 180, and may support the liquid crystal panel 200. For example, the cover bottom 400 may be composed only of a bottom part and a lateral part in order to realize a minimized slim bezel region. Specifically, the cover bottom 400 may include the bottom part having a rectangular shape and the lateral part projecting upwards from one side of the bottom part by a predetermined height. The cover bottom 400 is only for illustrative purposes, and any of cover bottoms 400 having various shapes may be applied to the display device 1 according to the present disclosure.

In the display device 1 according to the embodiment, the through hole H is formed through the upper polarization plate 110, and the camera hole CH, in which the camera 2 is mounted, is formed though the backlight unit 300 and the cover bottom 400. The transparent portion 230 in the liquid crystal panel 200 is disposed between the through hole H and the camera hole CH.

Further, the display device 1 according to the embodiment may include various types of optical sensors such as an infrared sensor, an illumination sensor, etc. Another through hole H in the upper polarization plate 110, another transparent portion 230 in the liquid crystal panel 200, and a sensor hole though the lower polarization plate 120 and the backlight unit 300 and the cover bottom 400 as the camera hole CH may be disposed to correspond to each of the optical sensors. Each of the camera hole CH and the sensor hole may be referred to as the through hole for an optical module or a through hole. In some embodiments, the camera hole CH will be described as an example. In some embodiments, the optical module is replaced with an electrical module. Examples of electrical modules includes microphones and speakers or any other types of electrical devices.

Figure 3:
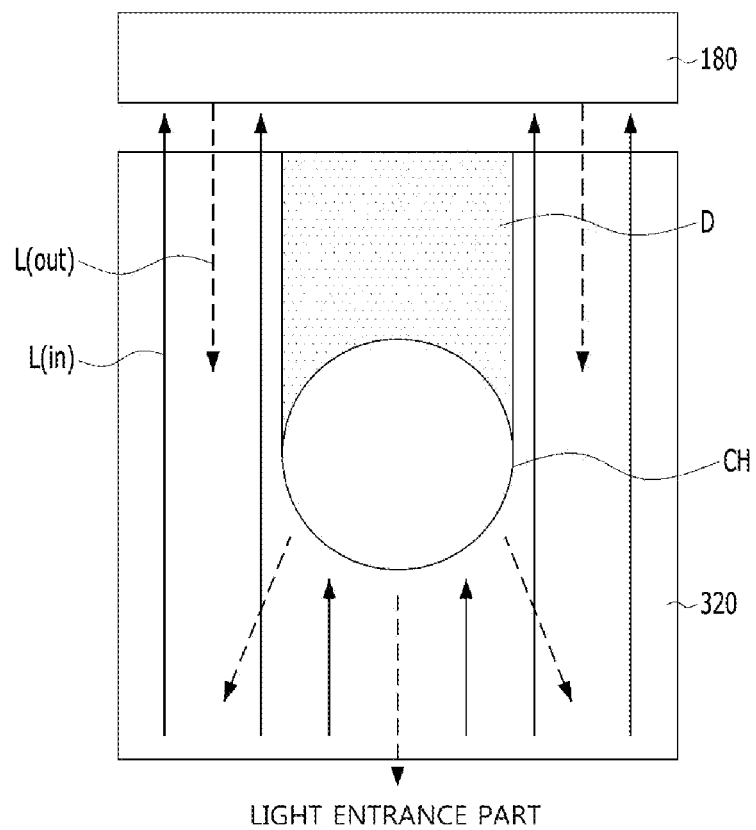
FIG. 3 is a schematic plan view showing a camera hole region of a comparative example.

FIG. 3 is a schematic plan view showing a camera hole region of a comparative example.

As illustrated in FIG. 3, a guide panel 180 is disposed adjacent to the light guide plate 320 so as to support the liquid crystal panel 200 (see FIG. 2) at the peripheral area of the rear surface of the liquid crystal panel 200 and to hold the liquid crystal panel 200 while guiding the lateral surface of the liquid crystal panel 200.

The light guide plate 320 receives light L(in) from a light entrance part at which the light source is positioned, and guides the light toward the liquid crystal panel 200. After the light L(in) that enters through the light entrance part travels (e.g., straight) in the light guide plate 320 and passes through the light guide plate 320, the light L(out) may be reflected by the guide panel 180 adjacent to the light guide plate 320 and may then enter the light guide plate 320 again.

In this example, because the camera hole CH, which is positioned in the light guide plate 320, is able neither to directly reflect the light L(in) that enters through the light guide plate 320 from the light entrance part nor to transmit the light to the region of the light guide plate 320 that is positioned behind the camera hole CH with respect to the light entrance part, a dark region D, which is darker than the ambient region, occurs. The dark region D deteriorates aspects of performance of the liquid crystal panel 200, such as resolution, brightness and the like. The dark region D may extend to a portion of the periphery of the light guide plate 320. This portion may be referred to as the peripheral portion. In one embodiment, the dark region D is a portion of the light guide plate 320 positioned between the upper edge of the light guide plate and the hole CH where the portion is overlapped by the hole CH.

Figure 4:
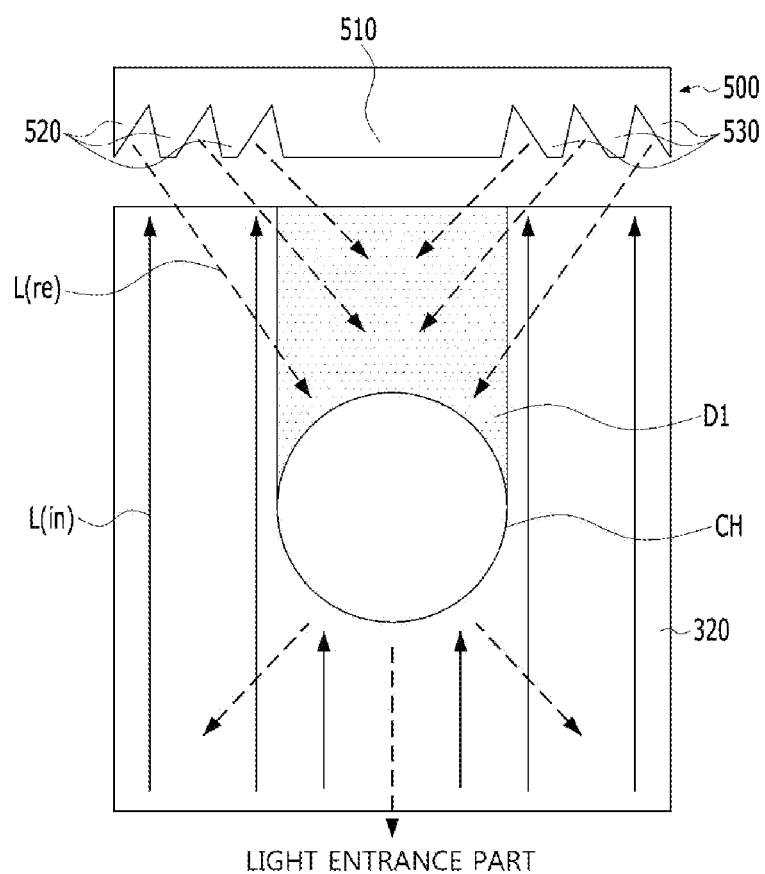
FIG. 4 is a schematic plan view showing a camera hole region of a display device according to a first embodiment.
Figure 5:
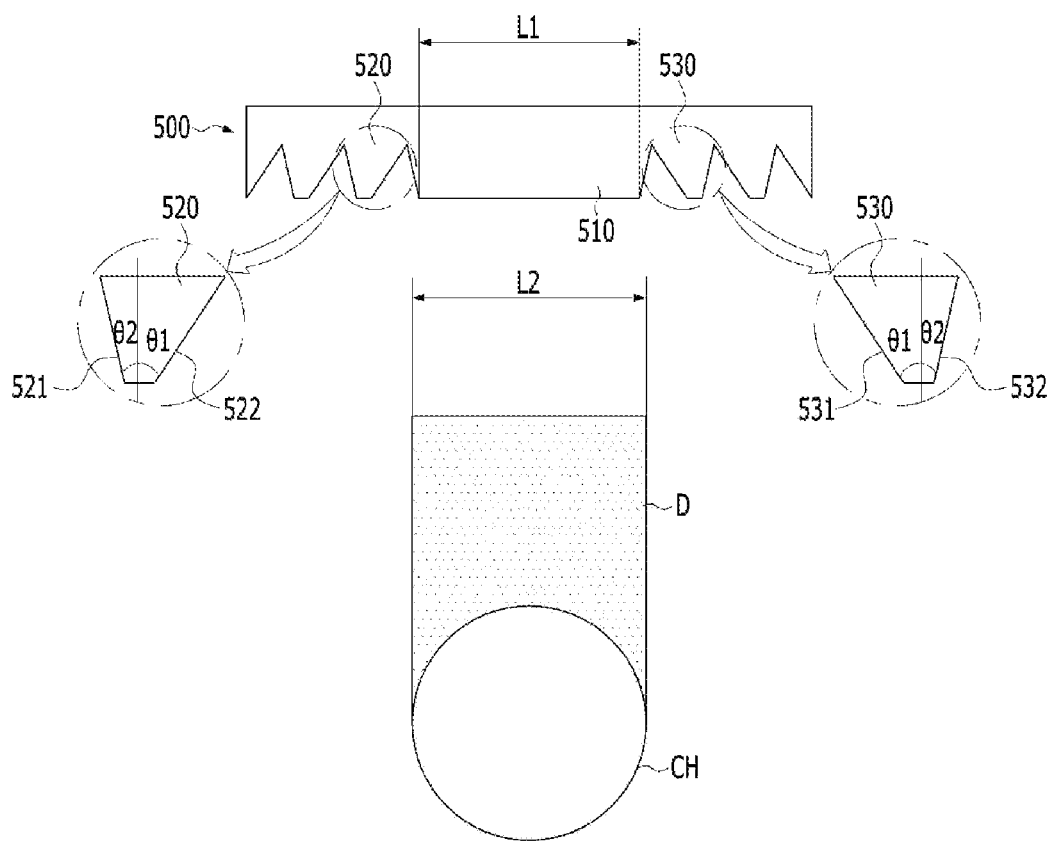
FIG. 5 is a detailed view of a guide panel shown in FIG. 4, according to the first embodiment.

FIG. 4 is a schematic plan view showing a camera hole region of a display device according to a first embodiment. FIG. 5 is a detailed view of the guide panel shown in FIG. 4.

Referring to FIGS. 4 and 5, the display device 1 according to the first embodiment includes reflective prism portions 510, 520 and 530 provided on the surface of the guide panel 500 that faces the light guide plate 320 in order to eliminate the dark region D that occurs near the camera hole CH in the above-described comparative example. The reflective prism portions 510, 520 and 530 may be referred to as a reflection enhancement structure.

The reflection enhancement structure according to the present disclosure may be provided on any one of the surfaces of the light guide plate 320 and the guide panel 500, which face each other. In this embodiment, the reflection enhancement structure including the reflective prism portions 510, 520 and 530, which are provided on the guide panel 500, will first be described. For example, the reflection enhancement structure is disposed to the lateral surface of the guide panel 500 that faces the lateral surface of the light guide plate 320 that is an opposite lateral surface with respect to the light entrance part.

The reflection enhancement structure may include a horizontal (planar) reflective portion 510, a first reflective prism portion 520 and a second reflective prism portion 530.

The horizontal reflective portion 510 has a horizontal (planar) surface, which is disposed parallel to the lateral surface of the light guide plate 320. The horizontal reflective portion 510 may reflect the light L(in) that enters (e.g., straight) through the light guide plate 320 from the light entrance part in a direction opposite the direction of straight travel. The horizontal reflective portion 510 may be disposed adjacent to the lateral wall of the light guide plate 320, in which the camera hole CH is formed, that is, adjacent to the dark region D1 of the light guide plate 320. The dark region D1 of the light guide plate 320 may be referred to as a first region of the light guide plate 320 between the guide panel 500 and the camera hole CH.

The first reflective prism portion 520 is positioned to the left of the horizontal reflective portion 510 of the guide panel 500 and has a plurality of reflective prisms. The first reflective prism portion 520 may be disposed adjacent to the portion of the light guide plate 320 that is positioned to the left of the dark region D1 of the camera hole CH. The first reflective prism portion 520 may be disposed to face the lateral surface of a second region of the light guide plate 320, wherein the second region of the light guide plate 320 is positioned to the first side of the first region D1 of the light guide plate 320 between the guide panel 500 and the camera hole CH.

As illustrated in FIG. 5, each of the plurality of reflective prisms, which are provided at the first reflective prism portion 520, may include a first reflective surface 521 and a second reflective surface 522. Further, the first reflective prism portion 520 may include a planar surface part between the first reflective surface 521 and the second reflective surface 522, as illustrated in FIG. 5. Here, the first reflective surface 521 may be positioned to the left (first side) of a vertical (straight) line parallel to the straight direction of the light L(in) that enters straight through the light guide plate 320 from the light entrance part, and the second reflective surface 522 may be positioned to the right of the vertical line. The vertical line may be perpendicular to the light entrance part as seen from the plan view of FIG. 3.

When the light L(in) enters the first reflective prism portion 520 through the light guide plate 320 from the light entrance part, the first reflective prism portion 520 may have a structure capable of reflecting the light L(in) toward the dark region D1 of the light guide plate 320, that is, in a rightward direction L(re), as illustrated in FIG. 4.

To this end, the width L1 of the horizontal reflective portion 510 may be equal to or smaller than the width L2 of the camera hole CH, and the second reflective surface 522 of the first reflective prism portion 520 may have an angle of inclination greater than that of the first reflective surface 521 (θ1>θ2), as illustrated in FIG. 5. In other words, assuming that the angle of inclination between the vertical line and the second reflective surface 522 is θ1 and that the angle of inclination between the vertical line and the first reflective surface 521 is θ2, the angle θ1 may be greater than the angle θ2. Consequently, the second reflective surface 522 has a greater length than the first reflective surface 521. The second reflective surfaces 522 of the first reflective prism portion 520 may reflect the light L(in) toward the dark region D1 of the light guide plate 320.

The second reflective prism portion 530 is positioned to the right of the horizontal reflective portion 510 of the guide panel 500 and has a plurality of reflective prisms. The second reflective prism portion 530 may be disposed adjacent to the portion of the light guide plate 320 that is positioned to the right of the dark region D1 of the camera hole CH. The second reflective prism portion 530 may be disposed to face the lateral surface of a third region of the light guide plate 320, wherein the third region of the light guide plate 320 is positioned to the second side of the first region D1 of the light guide plate 320 between the guide panel 500 and the camera hole CH.

Similarly, each of the plurality of reflective prisms of the second reflective prism portion 530 may include a first reflective surface 531 and a second reflective surface 532. Further, the second reflective prism portion 530 may include a planar surface part between the first reflective surface 531 and the second reflective surface 532, as illustrated in FIG. 5. Here, the first reflective surface 531 may be positioned to the left of the vertical (straight) line parallel to the straight direction in which the light L(in) enters straight through the light guide plate 320 from the light entrance part, and the second reflective surface 532 may be positioned to the right of the vertical line.

When the light L(in) enters the second reflective prism portion 530 through the light entrance part and the light guide plate 320, the second reflective prism portion 530 may have a structure capable of reflecting the light L(in) toward the dark region D1 of the light guide plate 320, that is, in a leftward direction L(re).

To this end, the first reflective surface 531 of the second reflective prism portion 530 may have an angle of inclination greater than that of the second reflective surface 522 (θ1>θ2), as illustrated in FIG. 5. In other words, assuming that the angle of inclination between the vertical line and the first reflective surface 531 is θ1 and that the angle of inclination between the vertical line and the second reflective line 532 is θ2, the angle θ1 may be greater than the angle θ2. Consequently, the first reflective surface 531 has a greater length than the second reflective surface 532. As a result, the reflective prisms of the first reflective prism portion 520 and the reflective prisms of the second reflective prism portion 530 may be disposed so as to be symmetrical to each other. The first reflective surfaces 531 of the second reflective prism portion 530 may reflect the light L(in) toward the dark region D1 of the light guide plate 320.

The reflective prisms of the first reflective prism portion 520 and the second reflective prism portion 530 may be recessed from the horizontal reflective portion 510. In other words, the reflective prisms of the first reflective prism portion 520 and the second reflective prism portion 530 may be recessed from the surface of the guide panel 500. Consequently, the guide panel 500, which is provided with the first reflective prism portion 520 and the second reflective prism portion 530, may effectively use the space without expansion of the display device.

Accordingly, the display device according to the first embodiment may eliminate the dark region D because the light L(in) that has entered from the light entrance part and has passed through the light guide plate 320 is transmitted as reflected light L(re) to the region of the light guide plate 320 that is located behind the camera hole CH with respect to the light entrance part by means of the plurality of reflective prisms, which are provided on the first reflective prism portion 520 and the second reflective prism portion 530. Consequently, the display device according to the embodiment is able to improve the resolution, brightness and the like of the liquid crystal panel 200.

Figure 6:
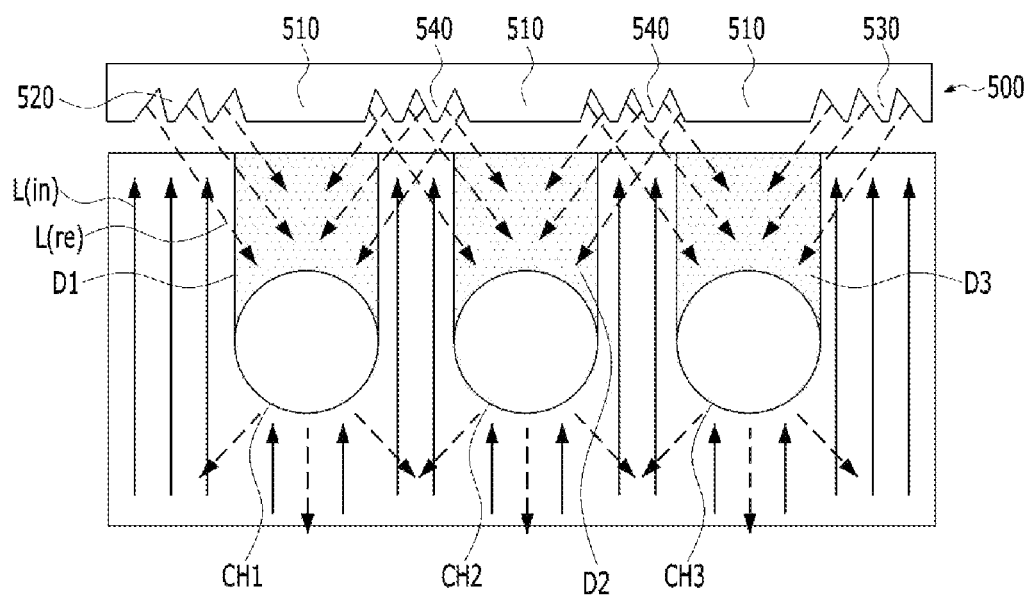
FIG. 6 is a schematic plan view showing camera hole regions of a display device according to a second embodiment.
Figure 7:
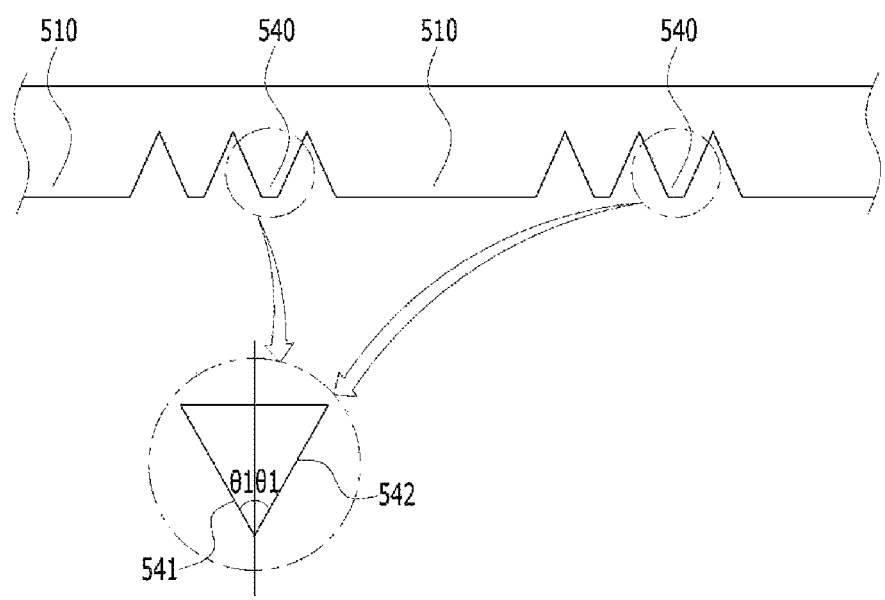
FIG. 7 is a detailed view of the guide panel shown in FIG. 6, according to the second embodiment.

FIG. 6 is a schematic plan view showing camera hole regions of a display device according to a second embodiment. FIG. 7 is a detailed view of the guide panel shown in FIG. 6.

In this embodiment, the descriptions of parts that are the same as those of the previous embodiment are omitted, and only parts that are different from those of the previous embodiment will be described.

As illustrated in FIG. 6, the display device according to the second embodiment includes a plurality of camera holes CH1, CH2 and CH3 provided at the light guide plate 320 so as to allow a plurality of cameras to be mounted thereat. Although three camera holes CH1, CH2 and CH3 are shown in FIG. 6, two or more camera holes may be provided as necessary. The camera holes CH1, CH2 and CH3 may be referred to as through holes CH1, CH2 and CH3 for optical modules, respectively.

In the embodiment, the guide panel 500 may include a reflection enhancement structure including a plurality of horizontal (planar) reflective portions 510, a first reflective prism portion 520, a second reflective prism portion 530 and a pair of third reflective prism portions 540.

The plurality of horizontal reflective portions 510 are positioned behind the camera holes CH1, CH2 and CH3, that is, adjacent to the dark regions D1, D2 and D3 of the light guide plate 320. In the embodiment, each of the horizontal reflective portions 510 may be disposed to correspond to each of the dark regions D1, D2 and D3 as first regions of the light guide plate 320.

The first reflective prism portion 520 may be positioned to the left of the horizontal reflective portion 510 that is positioned at the leftmost side, and may include a plurality of reflective prisms. The first reflective prism portion 520 may be disposed adjacent to the portion of the light guide plate 320 that is positioned to the left of the dark region D1 of the first camera hole CH1. The first reflective prism portion 520 may be disposed to face the lateral surface of a second region of the light guide plate 320 that is positioned to the first side of any one D1 of the first regions D1, D2 and D3.

The second reflective prism portion 530 may be positioned to the left of the horizontal reflective portion 510 that is positioned at the rightmost side, and may include a plurality of reflective prisms. The second reflective prism portion 530 may be disposed adjacent to the portion of the light guide plate 320 that is positioned to the right of the dark region D3 of the third camera hole CH3. The second reflective prism portion 530 may be disposed to face the lateral surface of a third region of the light guide plate 320 that is positioned to the second side of any one D3 of the first regions D1, D2 and D3.

The plurality of reflective prisms, which are provided at the first reflective prism portion 520 and the second reflective prism portion 530, may include the first reflective surfaces 521 and 531 and the second reflective surfaces 522 and 532 as in the previous embodiment. Similarly, to the previous embodiment, the second reflective surface 522 of the first reflective prism portion 520 may have a greater angle of inclination than the first reflective surface 521 of the first reflective prism portion 520, and the first reflective surface 531 of the second reflective prism portion 530 may have a greater angle of inclination than the second reflective surface 532 of the second reflective prism portion 530.

The pair of third reflective prism portions 540 may be positioned to the right and the left of the dark region D2 of the light guide plate 320 at which the second camera hole CH2 is positioned. Each of the third reflective prism portions 540 may be disposed to face the lateral surface of a fourth region between the adjacent first regions D1 and D2 (or D2 and D3) of the light guide plate 320.

As illustrated in FIG. 7, each of the plurality of reflective prisms provided at the third reflective prism portion 540 may include a first reflective surface 541 and a second reflective surface 542.

Although the first reflective prism portion 520 reflects the light to transmit the light toward the dark region D1 at which the first camera hole CH1 is positioned and the second reflective prism portion 530 reflects and transmits the light toward the dark region D3 at which the third camera hole CH3 is positioned, any one of third reflective prism portions 540 may concurrently reflect and transmit the light both toward the dark regions D1 and D2 at which the first camera hole CH1 and the second camera hole CH2 are positioned. The other one of third reflective prism portions 540 may concurrently reflect and transmit the light both toward the dark regions D2 and D3 at which the second camera hole CH2 and the third camera hole CH3 are positioned.

To this end, the first reflective surface 541 and the second reflective surface 542 of each of the plurality of reflective prisms provided at the third reflective prism portion 540 may have the same angle of inclination θ1, as illustrated in FIG. 7. In other words, the reflective prism may be configured to have the shape of an isosceles triangle in which the first reflective surface 541 and the second reflective surface 542 have the same angle of inclination θ1 and the same length.

Accordingly, since the light L(in) that has entered from the light entrance part and has passed though the light guide plate 320 is reflected as the reflected light L(re) to the dark regions D1, D2 and D3 of the light guide plate 320 behind the first to third camera holes CH1, CH2 and CH3 with respect to the light entrance part by means of the plurality of reflective prisms of the first reflective prism portion 520, the second reflective prism portion 530 and the third reflective prism portion 540, the display device according to the second embodiment is able to prevent the creation of a dark region. Consequently, the display device according to the embodiment is able to improve aspects of the performance of the liquid crystal panel 200, such as the resolution, brightness and the like thereof, even when the display device is provided with the plurality of cameras.

Figure 8:
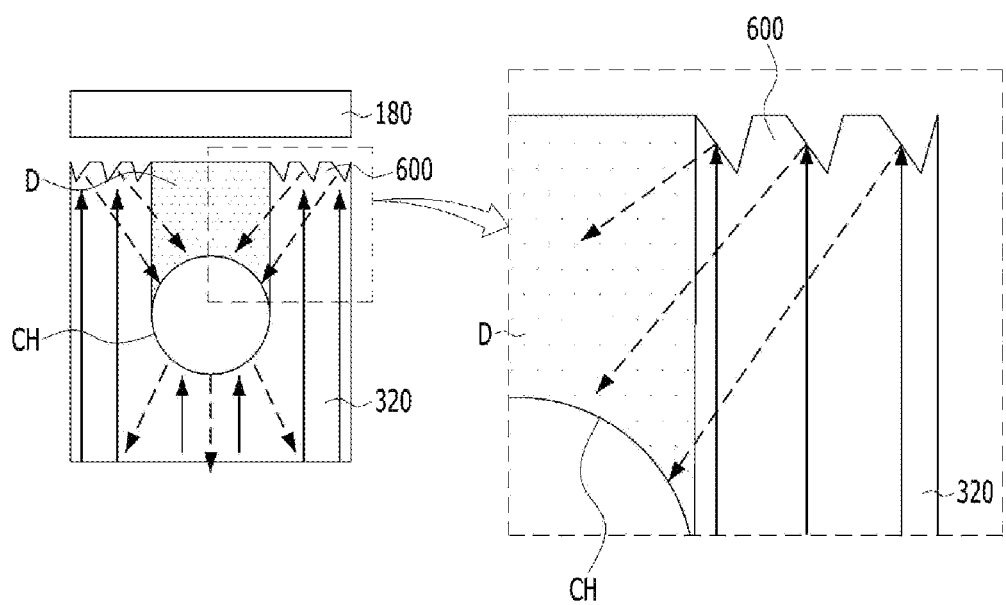
FIG. 8 is a schematic plan view showing a camera hole region of a display device according to a third embodiment.
Figure 9:
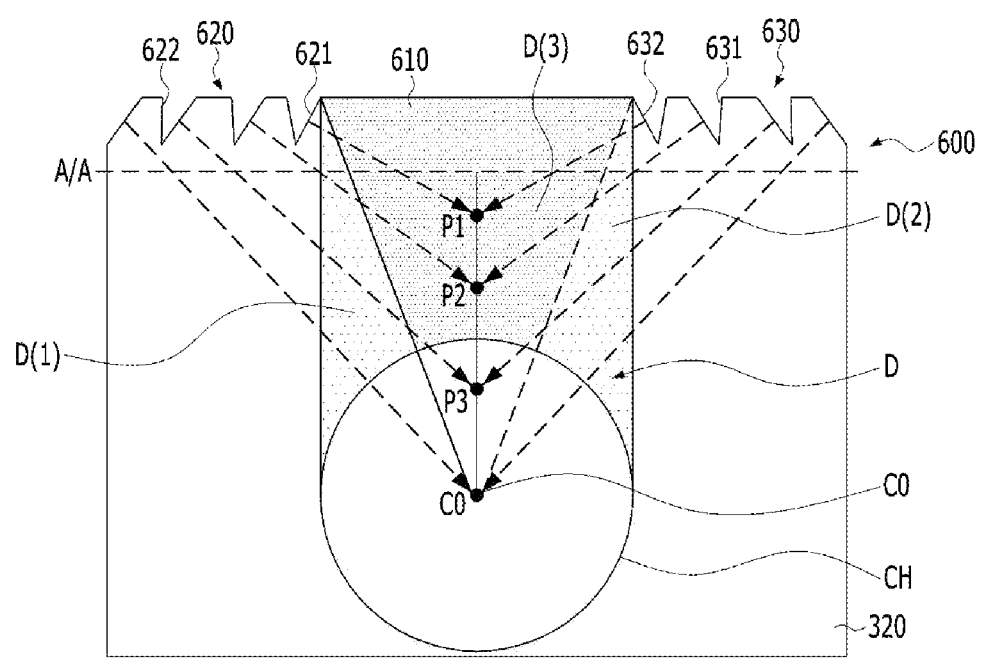
FIG. 9 is a detailed view of the light guide plate shown in FIG. 8, according to the third embodiment.

FIG. 8 is a schematic plan view showing a camera hole region of a display device according to a third embodiment. FIG. 9 is a detailed view of the light guide plate shown in FIG. 8.

According to the embodiment, reflection enhancement structure including the reflective prism portions is provided at the light guide plate 320, unlike the previous embodiments. The reflection enhancement structure as described in the previous embodiments may be applied to the light guide plate 320. The reflection enhancement structure may be disposed to the lateral surface of the light guide plate 320 that faces the lateral surface of the guide panel 180. The reflection enhancement structure of the light guide plate 320 may include a plurality of recesses of prism pattern that face the lateral surface of the guide panel 180. The reflection enhancement structure of the light guide plate 320 may disposed to outside of an active area (A/A in FIG. 9) of the light guide plate 320.

As illustrated in FIG. 8, the reflection enhancement structure may include a first reflective prism portion 620, which is positioned to the left (first side) of the dark region (first region) D of the light guide plate 320 at which the camera hole CH is positioned and which includes a plurality of reflective prisms, and a second reflective prism portion 630, which is positioned to the right (second side) of the dark region (first region) D of the light guide plate 320 and which includes a plurality of reflective prisms.

Each of the plurality of reflective prisms of the first reflective prism portion 620 and the second reflective prism portion 630 may include a first reflective surface 621 or 631 and a second reflective surface 622 or 632, as in the previous embodiments. In the embodiment, the first reflective surface 621 of the first reflective prism portion 620 may have a greater angle of inclination than the second reflective surface 622. The angle of inclination between the vertical line and the first reflective surface 621 may be greater than the angle of inclination between the vertical line and the second reflective surface 622. The second reflective surface 632 of the second reflective prism portion 620 may have a greater angle of inclination than the first reflective surface 631. The angle of inclination between the vertical line and the second reflective surface 632 may be greater than the angle of inclination between the vertical line and the first reflective surface 631.

Alternatively, the angle of inclination of the first reflective surfaces 621 and 631 and the angle of inclination of the second reflective surfaces 622 and 632 may be the same angle of inclination.

Referring to FIG. 8, it will be appreciated that the light that has passed through the light guide plate 320 is directly reflected and transmitted to the dark region D by means of the plurality of reflective prisms provided at the light guide plate 320 even without providing the guide panel 500 with the reflective prism portions shown in the previous embodiments.

As illustrated in FIG. 9, the light that has passed through the light guide plate 320 may be reflected and transmitted to regions P1, P2, P3 and C0 in the dark region D by means of the series of reflective prisms, including all reflective prisms from the reflective prism that is positioned nearest the dark region D to the reflective prism that is positioned farthest from the dark region D. To this end, the angles of inclination between the first reflective surfaces 621 or 631 and the second reflective surfaces 622 or 632 of the series of reflective prisms may be different from each other. For reference, C0 denotes the center region of the camera hole CH.

Accordingly, the display device according to the third embodiment is able to prevent creation of the dark region D because the light that has entered from the light entrance part and has reached the peripheral end of the light guide plate 320 is transmitted to the region of the light guide plate 320 behind the camera hole CH with respect to the light entrance part by means of the plurality of reflective prisms provided at the first reflective prism portion 620 and the second reflective prism portion 630. Consequently, the display device according to this embodiment is able to improve aspects of the performance of the liquid crystal panel 200, such as the resolution, brightness and the like thereof. Also, if the light guide plate 320 includes the plurality of camera holes CH1, CH2 and CH3 as illustrated in FIG. 6, the reflection enhancement structure of the light guide plate 320 further may include third reflective prism portions between the adjacent dark regions D. Each of the third reflective prism portion may include a plurality of prism patterns recessed from the lateral surface of light guide plate 320.

Figure 10A:
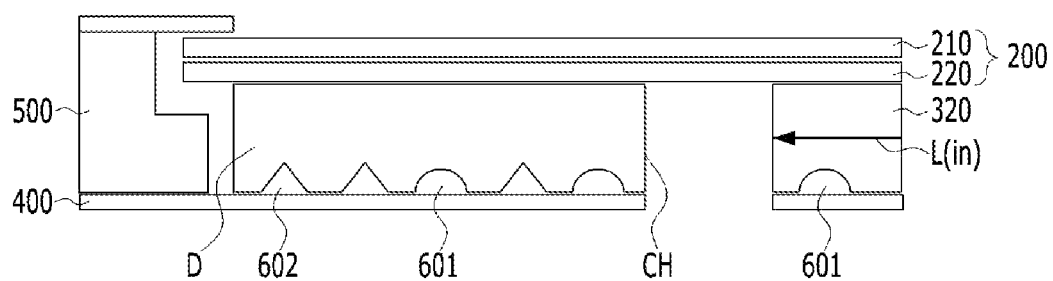
FIGS. 10A, 10B, and 10C are schematic side cross-sectional views showing a camera hole region of a display device according to a fourth embodiment.
Figure 10B:
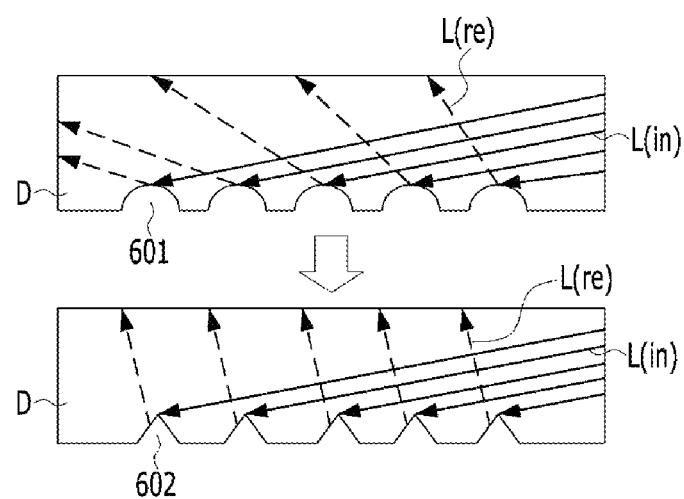
Figure 10C:
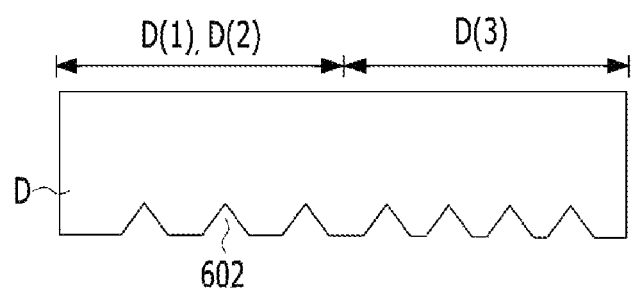

FIGS. 10A, 10B, and 10C are schematic side cross-sectional views showing a camera hole region of a display device according to a fourth embodiment.

Although the display devices according to the previous embodiments are able to prevent the creation of the dark region behind the camera hole CH by means of the reflective prism portions, the amount of the light that is transmitted to the center region D(3) may be somewhat smaller than the amount of the light that is transmitted to the side regions D(1) and D(2), as illustrated in FIG. 9.

In order to overcome this problem, the light guide plate 320 may be provided in the lower surface thereof with dot recesses 601 (also referred to as circular recesses) adapted to increase the amount of light that is transmitted to the dark region, as illustrated in FIGS. 10A, 10B, and 10C. Here, the lower surface of the dark region (first region) D of the light guide plate 320 behind the camera hole CH may further be provided with prism recesses 602. The dot recesses 601 are recesses in or protrusions from the lower surface. The dot recesses 601 reflect light and can have any shape, such as circular or hemispherical shapes. Similarly, prism recesses 602 may be recesses or protrusions and may have prismatic shapes that reflects light.

As illustrated in FIG. 10B, the prism recesses 602 may reflect the light L(in) that has entered the light guide plate 320 at a greater angle, that is, at a greater angle with respect to the upper surface of the light guide plate 320 L(re), compared to the dot recesses 601. Accordingly, by providing the dark region D of the light guide plate 320 with the prism recesses 602, it is possible to increase the amount of light that is transmitted to the dark region D.

The prism recesses 602 may be arranged to become increasingly dense moving toward the center region D(3) of the light guide plate 320, which is positioned at the straight line that extends through the center of the camera hole CH and to which a relatively small amount of light is transmitted, as illustrated in FIG. 9. As illustrated in the example of FIG. 10C, a density of the prism recesses 602 disposed in the center region D(3) is higher compared to a density of the prism recesses 602 disposed in the regions D(1) and D(2). In some embodiments, the density of prism recesses 602 increases linearly.

Accordingly, the display device according to the third embodiment is able to minimize the creation of the dark region D in combination with the previous embodiments because a larger amount of light is transmitted to the dark region of the light guide plate 320 behind the camera hole CH by means of the prism recesses 602. Consequently, the display device according to this embodiment is able to improve aspects of the performance of the liquid crystal panel 200, such as resolution, brightness and the like.

The display device according to the embodiment of the present disclosure may be applied to various electronic devices, such as TVs, smart phones and tablet PCs.

A display device according to any one embodiment may include a light guide plate having a through hole, wherein an optical module is disposed in the through hole, a liquid crystal panel disposed on the light guide plate, a guide panel disposed adjacent to the light guide plate so as to support the liquid crystal panel, and a reflection enhancement structure provided on any one of the surfaces of the light guide plate and the guide panel that face each other. The reflection enhancement structure may include a plurality of reflective prisms disposed adjacent to the peripheral portion of the through hole of the light guide plate.

The light guide plate may include a first region between the through hole and the guide panel, a second region disposed to a first side of the first region, and a third region disposed to a second side of the first region. The reflection enhancement structure may include a first reflective prism portion including a plurality of first reflective prisms, which are disposed in a first region of the guide panel adjacent to the second region of the light guide plate, and a second reflective prism portion including a plurality of reflective prisms, which are disposed in a second region of the guide panel adjacent to the third region of the light guide plate.

The reflection enhancement structure further may include a planar reflective portion between the first and second reflective prism portions of the guide panel and being adjacent to the first region of the light guide plate.

The planar reflective portion may have a width that is equal to or smaller than the width of the through hole.

The light guide plate may include a first region between the through hole and the guide panel, a second region disposed to a first side of the first region, and a third region disposed to a second side of the first region. The reflection enhancement structure may include a first reflective prism portion including a plurality of first reflective prisms, which are disposed in the lateral surface of the second region of the light guide plate; and a second reflective prism portion including a plurality of second reflective prisms, which are disposed in the lateral surface of the third region of the light guide plate.

Each of the first and second reflective prisms may include a first reflective surface disposed to a first side to a straight direction in which light enters straight through the light guide plate from a light entrance part, and a second reflective surface disposed to a second side of the straight direction.

The second reflective surface of the first reflective prism may have an angle of inclination greater than an angle of inclination of the first reflective surface of the first reflective prism, and the first reflective surface of the second reflective prism may have an angle of inclination greater than an angle of inclination of the second reflective surface of the second reflective prism.

The second reflective surfaces of the first reflective prisms and the first reflective surfaces of the second reflective prisms may reflect the light from the light guide plate to the first region of the light guide plate.

The first reflective prism portion may be symmetrical to the second reflective prism portion.

The first reflective prisms and the second reflective prisms may be recessed from the planar reflective portion.

The planar reflective portion faces the lateral surface of the first region of the light guide plate; the first reflective prism portion faces the lateral surface of the second region of the light guide plate; and the second reflective prism portion faces the lateral surface of the third region of the light guide plate.

The light guide plate may include dot recesses disposed in a lower surface of the light guide plate, and the first region of the light guide plate includes the dot recesses and prism recesses disposed in the lower surface of the first region.

The prism recesses may be arranged to become increasingly dense going toward a center straight line in the first region of the light guide plate the center straight line extending through a center of the through hole.

A display device according to any one embodiment may include a light guide plate including through holes, wherein optical modules are disposed in the through holes of the light guide plate, respectively; a liquid crystal panel disposed on the light guide plate; a guide panel disposed adjacent to the light guide plate so as to support the liquid crystal panel; and a reflection enhancement structure provided on any one of surfaces of the light guide plate and the guide panel that face each other. The reflection enhancement structure may include a plurality of reflective prisms disposed adjacent to the peripheral portion of the through holes of the light guide plate.

The reflection enhancement structure is formed in a lateral surface of the guide panel, which faces a lateral surface of the light guide plate. The light guide plate may include first regions disposed respectively between the guide panel and the through holes of the light guide plate, a second region disposed to a first side of a first one of the first regions, a third region disposed to a second side of a last one of the first regions, and at least one fourth region between adjacent first regions. The reflection enhancement structure may include a first reflective prism portion including a plurality of first reflective prisms, which are disposed to a first region of the guide panel adjacent to the second region of the light guide plate, a second reflective prism portion including a plurality of second reflective prisms, which are disposed to a second region of the guide panel adjacent to the third region of the light guide plate, and at least one third reflective prism portion including a plurality of third reflective prisms, which are disposed to at least one third region of the guide panel adjacent to the at least one fourth region of the light guide plate.

The reflection enhancement structure further may include planar reflective portions of the guide panel facing the first regions of the light guide plate, respectively. Each of the planar reflective portions has a width equal to or smaller than a width of each of the through holes.

Each of the first reflective prisms, each of the second reflective prisms, and each of the third reflective prisms may include a first reflective surface disposed to a first side to a straight direction in which light enters straight through the light guide plate from a light entrance part; and a second reflective surface disposed to a second side of the straight direction.

The second reflective surface of the first reflective prism may have an angle of inclination greater than an angle of inclination of the first reflective surface of the first reflective prism. The first reflective surface of the second reflective prism may have an angle of inclination greater than an angle of inclination of the second reflective surface of the second reflective prism. The first reflective surface of the third reflective prism has the same angle of inclination as an angle of inclination of the second reflective surface of the third reflective prism.

The second reflective surfaces of the first reflective prisms may reflect the light from the light guide plate to the first one of the first regions of the light guide plate. The first reflective surfaces of the second reflective prisms may reflect the light from the light guide plate to the last one of the first regions of the light guide plate. The first and second reflective surfaces of the third reflective prisms may reflect the light from the light guide plate to the adjacent first regions of the light guide plate.

The first reflective prisms, the second reflective prisms, the third reflective prisms may be recessed from the planar reflective portion. The first reflective prism portion may be symmetrical to the second reflective prism portion.

The light guide plate may include dot recesses disposed in a lower surface of the light guide plate; and the first regions of the light guide plate includes the dot recesses and prism recesses disposed in the lower surface of the first regions.

The prism recesses may be arranged to become increasingly dense going toward a center straight line in each of the first regions of the light guide plate.

As described above, according to the display device according to the embodiment of the present disclosure, it is possible to prevent creation of the dark region (first region) behind the camera hole and to improve aspects of the performance of the display by transmitting light to the dark region.

The features, configurations, effects and the like described above in the embodiments are included in at least one embodiment, but do not need to be limited only to the at least one embodiment. In addition, the features, configuration, effects and the like exemplified in the respective embodiments may be combined with other embodiments or modified by those skilled in the art. Accordingly, the content related to such combinations and modifications should be understood to fall within the scope of the embodiments.

What is claimed is:

1. A display device comprising:
   a light guide plate having a through hole;
   an optical module disposed in the through hole;
   a liquid crystal panel disposed on the light guide plate;
   a guide panel disposed adjacent to the light guide plate, the guide panel supporting the liquid crystal panel; and
   a reflection enhancement structure provided on at least a lateral surface of the light guide plate or a lateral surface of the guide panel that faces the lateral surface of the light guide plate, wherein the reflection enhancement structure includes a plurality reflective prisms disposed adjacent to a peripheral portion of the through hole of the light guide plate,
   wherein a first region of the light guide plate includes circular recesses and prism recesses disposed in a lower surface of the light guide plate, and
   wherein the first region is disposed between the guide panel and the through hole of the light guide plate.

2. The display device according to claim 1, wherein:
   the light guide plate includes a first region between the through hole and the guide panel, a second region disposed to a first side of the first region, and a third region disposed to a second side of the first region; and
   the reflection enhancement structure comprises:
   a first reflective prism portion including a plurality of first reflective prisms disposed in a first region of the guide panel, the first region of the guide panel adjacent to a lateral surface of the second region of the light guide plate;
   a second reflective prism portion including a plurality of second reflective prisms disposed in a second region of the guide panel, the second region adjacent to a lateral surface of the third region of the light guide plate; and
   a planar reflective portion between the first reflective prism portion of the guide panel and the second reflective prism portion of the guide panel, the planar reflective portion adjacent to a lateral surface of the first region of the light guide plate.

3. The display device according to claim 2, wherein the planar reflective portion has a width equal to or less than a width of the through hole.

4. The display device according to claim 2, wherein:
   each of the first reflective prisms and the second reflective prisms comprise a first reflective surface and a second reflective surface,
   the second reflective surfaces of the first reflective prisms have an angle of inclination with respect to a vertical axis in a plan view of the display device greater than an angle of inclination of the first reflective surface of the first reflective prisms, and
   the first reflective surfaces of the second reflective prisms have an angle of inclination with respect to the vertical axis greater than an angle of inclination of the second reflective surface of the second reflective prisms.

5. The display device according to claim 2, wherein:
   each of the first reflective prisms and the second reflective prisms comprise a first reflective surface and a second reflective surface, and
   the second reflective surfaces of the first reflective prisms and the first reflective surfaces of the second reflective prisms reflect the light from the light guide plate to the first region of the light guide plate.

6. The display device according to claim 2, wherein the first reflective prism portion is symmetrical to the second reflective prism portion and the first reflective prisms and the second reflective prisms are recessed from a surface of the guide panel.

7. The display device according to claim 1, wherein:
   the light guide plate includes a first region between the through hole and the guide panel, a second region disposed to a first side of the first region, and a third region disposed to a second side of the first region, and
   the reflection enhancement structure comprises:
   a first reflective prism portion including a plurality of first reflective prisms disposed in a lateral surface of the second region of the light guide plate; and
   a second reflective prism portion including a plurality of second reflective prisms disposed in a lateral surface of the third region of the light guide plate.

8. The display device according to claim 7, wherein:
   each of the first reflective prisms and the second reflective prisms comprise a first reflective surface and a second reflective surface,
   the first reflective surfaces of the first reflective prisms have an angle of inclination with respect to a vertical axis in a plan view of the display device greater than an angle of inclination of the second reflective surface of the first reflective prisms,
   the second reflective surfaces of the second reflective prisms have an angle of inclination with respect to the vertical axis greater than an angle of inclination of the first reflective surface of the second reflective prisms, and
   the first reflective prism portion are symmetrical to the second reflective prism portion, wherein the first reflective prisms and the second reflective prisms are recessed from the lateral surfaces of the light guide plate, which face a lateral surface of the guide panel.

9. The display device according to claim 1, wherein a density of the prism recesses increases with proximity to a straight center line in the first region of the light guide plate, wherein the straight center line extends through a center of the through hole.

10. A display device comprising:
a light guide plate including a plurality of through holes,
a plurality of optical modules, each of the plurality of optical modules disposed in a corresponding one of the plurality of through holes;
a liquid crystal panel disposed on the light guide plate;
a guide panel disposed adjacent to the light guide plate, the guide panel supporting the liquid crystal panel; and
a reflection enhancement structure including a plurality of reflective prisms disposed adjacent to a peripheral portion of the through holes of the light guide plate,
wherein the light guide plate includes:
first regions disposed respectively between the guide panel and the through holes of the light guide plate,
a second region disposed to a first side of a first one of the first regions,
a third region disposed to a second side of a last one of the first regions, and
at least one fourth region between adjacent first regions,
wherein the reflection enhancement structure comprises:
a first reflective prism portion including a plurality of first reflective prisms disposed to a first region of a lateral surface of the guide panel, the first region of the lateral surface of the guide panel adjacent to the second region of a lateral surface of the light guide plate,
a second reflective prism portion including a plurality of second reflective prisms disposed to a second region of the lateral surface of the guide panel, the second region of the lateral surface adjacent to the third region of a lateral surface of the light guide plate,
at least one third reflective prism portion including a plurality of third reflective prisms disposed to at least one third region of the guide panel, the at least one third region adjacent to the at least one fourth region of the light guide plate, and
planar reflective portions of the guide panel adjacent to the first regions of the light guide plate,
wherein each of the planar reflective portions has a width equal to or less than a width of each of the through holes,
wherein a first region from the first regions of the light guide plate includes circular recesses and prism recesses disposed in a lower surface of the light guide plate.

11. The display device according to claim 10, wherein:
each of the first reflective prisms, each of the second reflective prisms, and each of the third reflective prisms comprises a first reflective surface and a second reflective surface,
the second reflective surfaces of the first reflective prisms have an angle of inclination with respect to a vertical axis in a plan view of the display device greater than an angle of inclination of the first reflective surface of the first reflective prisms,
the first reflective surfaces of the second reflective prisms have an angle of inclination with respect to the vertical axis greater than an angle of inclination of the second reflective surface of the second reflective prisms, and
the first reflective surfaces of the third reflective prisms have a same angle of inclination with respect to the vertical axis as an angle of inclination of the second reflective surface of the third reflective prisms.

12. A display device comprising:
a liquid crystal panel comprising an active area that emits light that forms an image;
a light guide plate on the liquid crystal panel, the light guide plate having a hole that is overlapped by the active area of the liquid crystal panel;
an electrical module disposed in the hole;
a guide panel on the liquid crystal panel and adjacent to the light guide plate, the guide panel supporting the liquid crystal panel,
wherein at least one of an edge of the light guide plate or an edge of the guide panel includes one or more indentations that are non-overlapping with the hole,
wherein a first region of the light guide plate includes circular recesses and prism recesses disposed in a lower surface of the light guide plate, and
wherein the first region is disposed between the guide panel and the hole of the light guide plate.

13. The display device of claim 12, wherein the one or more indentations are non-overlapping with a region of the light guide plate that is between the hole and the guide panel from a plan view of the display device.

14. The display device of claim 13, wherein a width of the region is less than or equal to a diameter of the hole.

15. The display device of claim 13, wherein the one or more indentations include angled surfaces that reflect light to the region.

16. The display device of claim 12, wherein a first portion of the one or more indentations are positioned to a first side of the region, and a second portion of the one or more indentations are positioned to a second side of the region.

17. The display device of claim 12, wherein the indentations are in the edge of the light guide plate but not in the edge of the guide panel or the indentations are in the edge of the guide panel but not in the edge of the light guide plate.

* * * * *